July 13, 1943.     H. G. LEHMANN     2,324,404
IGNITION TESTING AND ENGINE TREATING DEVICE
Filed Nov. 14, 1940     2 Sheets-Sheet 1
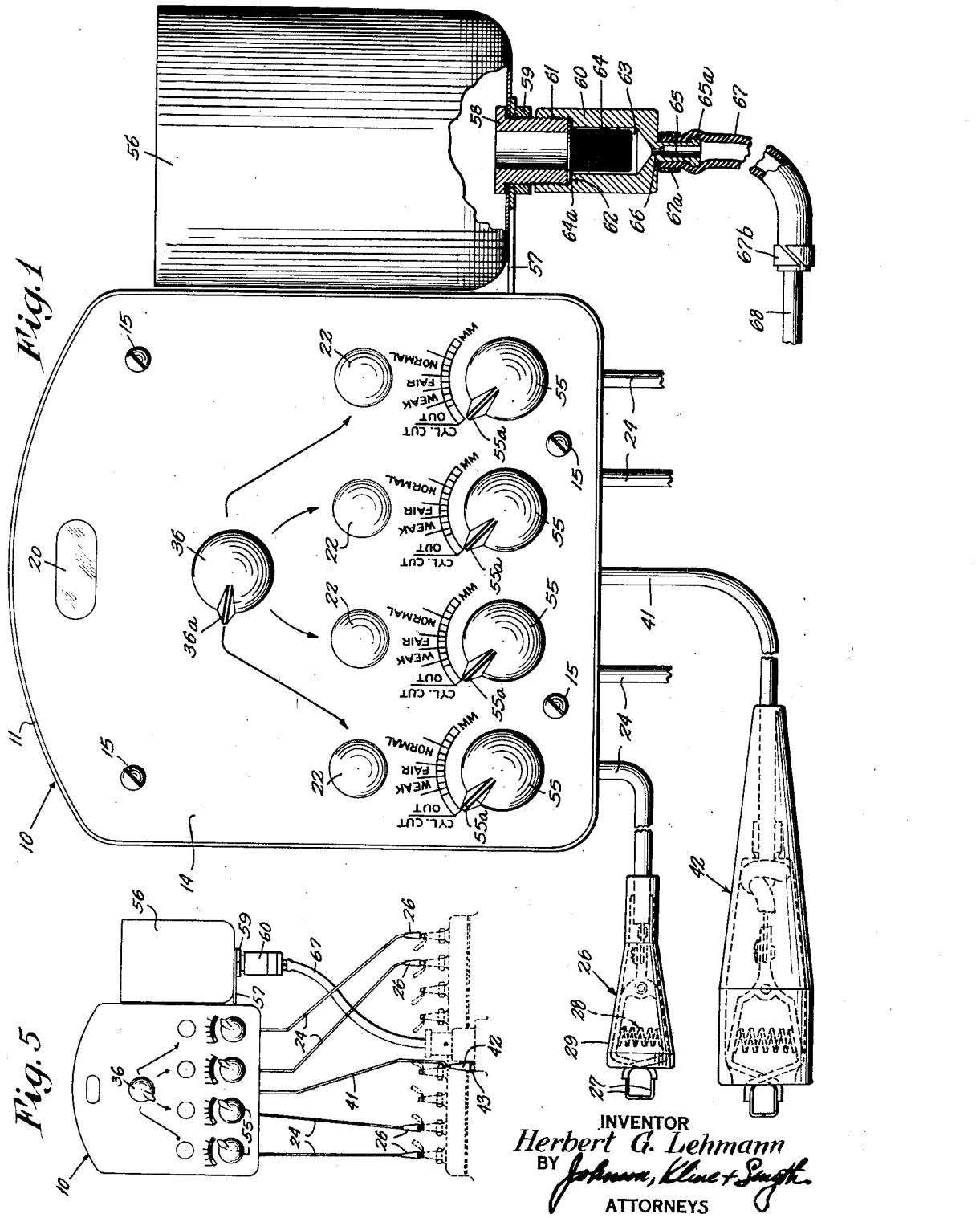
INVENTOR
Herbert G. Lehmann
BY Johnson, Kline + Smyth
ATTORNEYS July 13, 1943.   H. G. LEHMANN   2,324,404
IGNITION TESTING AND ENGINE TREATING DEVICE
Filed Nov. 14, 1940   2 Sheets-Sheet 2
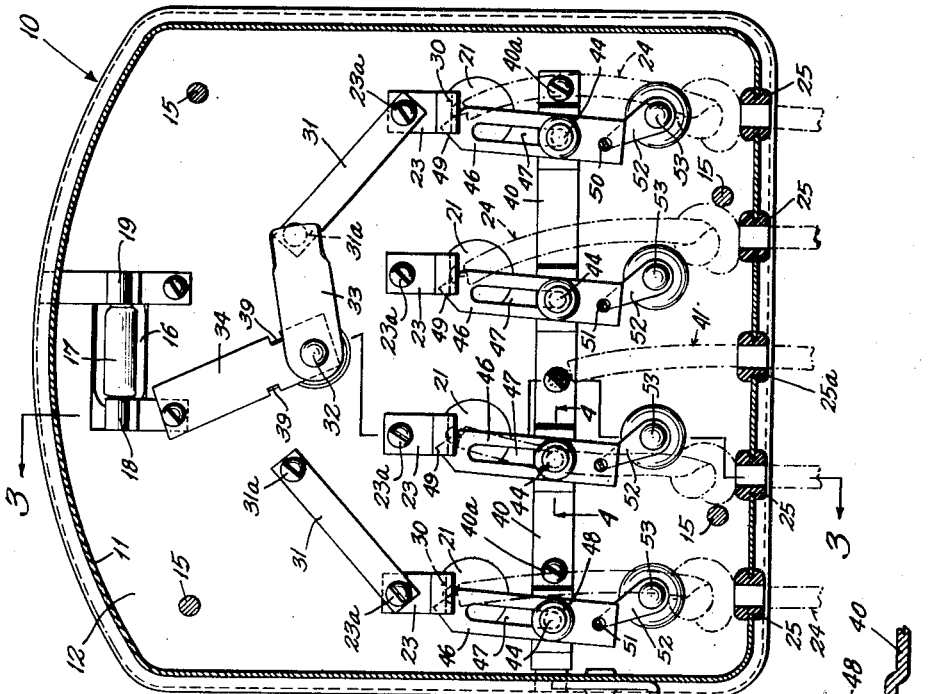
INVENTOR
Herbert G. Lehmann
BY
ATTORNEYS Patented July 13, 1943

2,324,404

UNITED STATES PATENT OFFICE 2,324,404

IGNITION TESTING AND ENGINE TREATING DEVICE

Herbert G. Lehmann, Bridgeport, Conn., assignor to Casco Products Corporation, Bridgeport, Conn., a corporation of Connecticut Application November 14, 1940, Serial No. 365,587

16 Claims. (Cl. 175—183)

The present invention relates to improvements in a testing device for ignition systems of automobile engines including also means for degumming the cylinders and valves of the engine.

It is an object of the present invention to provide a device for the aforesaid purpose of relatively simple and inexpensive construction which provides an efficient and convenient means for testing the engine and for degumming the cylinders and valves thereof.

Another object is to provide a device for testing the efficiency of the ignition in each cylinder and of determining the resistance or spacing of the spark plug points in a relatively accurate manner.

A further object is to provide a device for accomplishing the aforesaid tests wherein the danger of fire from exposed sparks in the neighborhood of combustible fumes is avoided.

Still another object is to provide a device for the aforesaid purpose wherein no high tension contacts are exposed, whereby the danger of shocks to the operator of the device is avoided.

It it also an object to provide an adjustable spark gap mechanism of novel construction, for determining the spacing or resistance of spark plug points of an engine in a testing device having the advantages set forth in the preceding paragraphs.

A further object is to provide a reservoir for introducing a treatment fluid into the cylinders of an automabile engine, having outlet connections for admitting a degumming fluid through the carburetor, whereby the rate of flow of the liquid is automatically reglated.

Other features and advantages will appear from the following description referring to the accompanying drawings, in which:

Figure 1 is a front elevation of the testing device of the present invention, including a reservoir for a degumming liquid, tube and filter elements of which are shown in cross-section, and including in dotted lines the details of the clips for connecting the leads of the testing device to the spark plugs and ground connection in an automobile engine.

Fig. 2 is a rear elevation of the control panel of the testing device of Fig. 1, the rear wall of the casing of said device being cut away and shown in cross-section substantially along the line 2—2' of Fig. 3.

Fig. 3 is a vertical cross-section of the testing device along the line 3—3' in Fig. 2.

Fig. 4 is a fragmentary detail in cross-section of an adjustable spark gap including a sliding contact and a carrier strip therefor, the section being taken along line 4—4' in Fig. 2.

Fig. 5 is a schematic front view of the testing device and liquid reservoir of the present invention, showing the leads thereof connected to the spark plugs and ground connection of an automobile engine, and a tube from the liquid reservoir connected to the carburetor.

Fig. 6 is a detail in perspective showing the disposition of the end of the outlet tube from the liquid reservoir inserted into a venturi of the carbureter intake for the treatment of the cylinders or valves of the engine with degumming liquid contained in the reservoir.

According to the present invention, a testing device is provided having a casing within which is mounted a luminous gaseous discharge tube, with means for connecting the tube successively to a series of contacts which are adapted to be joined by suitable leads to the high tension terminals of the spark plugs of an automobile engine, and a series of adjustable spark gaps, one terminal of each of which is also adapted to be connected to the high tension terminals of the said spark plugs. The opposite terminal of the luminous discharge tube as well as the other terminals of the spark gaps are grounded through the casing of the device by means of a suitable lead adapted to be connected to a portion of the engine block. All external metal parts of the casing are grounded, and all of the high tension connections are either housed within the casing or suitably insulated, whereby the operator is protected from shocks while manipulating the testing device. Furthermore, the disposition of the adjustable spark gaps within the casing protects the sparks formed between the points thereof from access of combustible fumes which are liable to be present in the vicinity of an automobile engine, especially in garages and thus the danger of fire or explosion and the accompanying damage to life and property is avoided.

According to the invention, a single luminous discharge tube is provided for testing each of the spark plugs and is mounted in fixed position within the casing of the testing device behind a sight window. As a result, the illumination of the tube is observed against a dark background, and the tube may be always observed at the same angle, whereby variations of intensity of illumination are readily observed. By using a single tube, variations in the characteristics of the tube are eliminated in testing the various spark plugs of the engine, one at a time.

Furthermore, the adjustable spark gaps are also disposed behind windows in the casing so that the sparks formed thereby are likewise readily observed against a dark background. Preferably, the windows contain magnifying lenses whereby the observation of the sparks is still more facilitated.

Referring to the drawings, the testing device 10 of the present invention is housed in a sheet metal casing 11, closed at the front by a panel 12 of wood, Bakelite or similar insulating material, which is seated against a shoulder 13 formed near the edge of the metal casing. The panel 12 is preferably provided with a facing 14 of smooth dielectric material and the panel and facing are secured to the casing 11 by means of a plurality of bolts 15 threaded into the rear wall of the said casing.

An elongated aperture 16 is formed near the top of the panel and facing, and a luminous electric discharge tube 17 is supported by a pair of metal clips 18 and 19 behind the apertures. The said clips constitute means for connecting the electrodes of the tube to a source of high tension E. M. F. and a ground. The tube 17 is filled with a rarified gas such as neon which becomes luminous under the influence of the high tension discharge. A window 20 of suitable transparent material, for instance, a transparent plastic resin or glass, covers the aperture 16 and may be supported by means of integral flanges 20a clamped between the panel 12 and the facing 14 as shown.

A series of circular apertures 21 are also formed in the panel and facing, and each is closed by a convex lens 22 of transparent or translucent material, such as glass or plastic resin, supported in position by means of a peripheral flange 22a which is clamped between the panel and the facing. The apertures and lenses are provided for observing sparks formed in spark gaps behind the panel.

Above each aperture 21, a metal clip 23 is fastened to the panel 12 by means of a bolt 23a. The free end of each clip 23 projects outwardly from the rear surface of the panel and is soldered to an insulated lead 24 which extends through an insulating bushing 25 in the metal wall of the casing 11. The outer end of the said lead terminates in a spring clip 26 of suitable construction for manual attachment to, or removal from, the high tension terminals of the spark plugs of an automobile engine. The clips 26 may advantageously comprise a pair of separable metal jaws 27, urged together by a compression spring 28, the manually gripped portions of the clip being surrounded by a flexible cover 29 of insulating material such as soft rubber.

Each of the bolts 23a also carries a metal strip 30 extending to the top of each aperture 21, said strip constituting one terminal of an adjustable spark gap.

The bolts 23a either constitute contacts themselves, or are connected by metal strips 31 to contacts 31a, disposed in a circle around a pivot 32 supported by the panel 12. A radial contactor 33 carried by the said pivot is adapted to establish contact successively with the bolts 23a or contacts 31a. From the pivot 32, a metal strip 34 provides an electrical connection to the metal clip 18 which engages one electrode of the luminous discharge tube 17. Thus, when the leads 24 are connected to the spark plugs of an automobile engine, the contactor 33 is adapted upon rotation to connect one electrode of the discharge tube 17 successively with each of the high tension terminals of the said spark plugs.

The metal clip 19, engaging the other electrode of the discharge tube, is joined to the metal casing 11 of the testing device, which is grounded as hereinafter described, so that the discharge tube reacts to the excitation provided by the intermittent high tension voltage supplied to the spark plug terminal to which it is joined by a luminous flash which may be observed by an operator through the window 20.

The pivot 32 comprises a rod 35, extending through the panel 12 and facing 14, and carrying on its outer end a knob 36 of insulating material secured thereto by means of a set screw 37 which engages a flattened portion of the said rod. At its inner end, the rod 35 is rigidly secured to the contactor 33 which overlies and engages one end of the strip 34. A spring washer 38 urges the strip 34 against the contact 33 thus forming a secure electric connection between the two. A pair of ears 39 bent outwardly from the edges of the strip 34 may be provided to limit the arcuate motion of the contactor 33. The knob 36 carries a pointer 36a which indicates, by means of suitable indicia on the facing of the panel, the position of the contactor 33 behind the panel. Thus, by manipulation of the knob 36, the contactor 33 may be adjusted to establish a circuit from the desired spark plug to the discharge tube 17.

As hereinbefore stated, the fixed contact of the adjustable spark gap behind each of the apertures 21 consists of the metal strip 30. According to the present invention, an adjustable contact of novel construction is provided for cooperation therewith. The latter comprises a metal carrier strip, fixed to the panel and having a stud engaging a longitudinal slot in a movable strip which constitutes the adjustable contact of the spark gap. Resilient means is preferably provided for urging the slotted strip against the fixed supporting strip to hold the former frictionally in any position of adjustment, but permitting relative sliding motion of the said strips upon application of a suitable force. By sliding the slotted strip over the stud, one end thereof may be moved toward or away from the fixed contact of the spark gap. Means for actuating and guiding the adjustable contact comprises a radial arm engaging the other end of the slotted strip, and rigidly secured to a pivot journaled in the panels, which may be rotated by means of a control knob on the opposite side of the panel. By rotation of the knob, the spacing between the end of the slidable strip constituting the movable spark gap terminal, and the fixed spark gap terminal may be adjusted as desired. Preferably, a pointer or mark on the knob, and a scale on the facing of the panel are provided to indicate the adjustment of the spark gap.

As shown in the accompanying drawings, the supporting metal strip comprises a metal strip 40 secured by bolts 40a to the rear surface of the panel below the apertures 21 and connected by means of an insulated lead 41 passing through an insulating bushing 25a in the wall of the casing 11 to a spring clip 42 similar in construction, but larger than the clip 26. At one end, the strip 40 is connected electrically to the metal wall of the casing 11. The clip 42 is adapted to be secured to the portion of the engine block, such as a bolt 43, constituting a ground connection. Accordingly, the casing 11 of the testing device is grounded through the said strip and lead.

Below each of the apertures 21, the strip 40 is bent outward to provide a portion thereof which is raised from the inner surface of the panel. A stud 44 extends through an aperture in each of these raised portions, the protruding end of the stud being of greater diameter than the portion extending through the aperture, and the latter portion being headed over to secure the stud like a rivet to the strip 40.

A metal contact strip 46 engages the protruding portion of the stud 44 by means of a longitudinal slot 47, and is retained thereon by the enlarged head 44a of the stud. A pair of convex spring washers 48 which are carried by the stud and inserted between the head 44a of the stud and the contact strip 46 with their concave surfaces facing each other, normally urge the strip 46 against the strip 40. By this means, a secure electrical connection between the strip 40 and the strip 46 is secured and the latter is frictionally held against casual movement with reference to the former.

One end of each of the strips 46 is cut to a point as indicated at 49, the pointed end forming an electrode for the spark gaps behind the apertures 21 in the panel.

The slot 47 is so disposed that when the strip 46 is slid over the stud 44 to one limit of its motion, the pointed end 49 is adapted to form a direct contact with the fixed terminal strip 30 extending to the top of the aperture 21 whereby the spark gap behind the aperture is short-circuited. Motion of the strip 46 toward the other limit of its motion is adapted to widen the spark gap between the point 49 and the strip 30.

In order to control the position of the strip 46, each is provided with an aperture 50 near the end opposite the point 49, said aperture being engaged by a hook 51 on the end of a radial arm 52 carried by a pivot 53. The latter comprises a rod 54 extending through the panel 12 of the facing 14. The arm 52 is rigidly secured to the inner end of the rod, while a knob 55 having a pointer 55a is secured to the outer end of the said rod, which protrudes through the panel facing, in the same manner as the knob 36 carried by the rod 35.

Engagement of the hook 51 on the radial arm 52 with the aperture 50 in the control strip 46 retains the pointed end 49 of the latter behind the aperture 21 in the position shown in Fig. 2.

The angular disposition of the arm 52 is such that rotation of the knob 55 through a limited arc moves the pointed end of the strip 46 across the apertures 21 toward or away from the fixed contact 30. Such angular disposition of the arm 52 and the strip 46 is shown in Fig. 2.

The facing 14 of the panel bears suitable indicia as shown in Fig. 1, indicating, for instance, in millimeters, the approximate gap between the end 49 of the strip 46 and the corresponding contact 30 for any position of the pointer 55a of the said knob. At one end of the range of the pointer, shown at the left of each of the knobs in Fig. 1, the spark gap behind the corresponding apertures 21 is short-circuited so that when leads 24 and 41 are attached respectively to the spark plug and ground connection of an automobile engine, and the pointer is moved all the way to the left, the spark plug of the engine will be short-circuited and will cease to function.

At one side of the testing device, a cup or reservoir 56 is mounted on a bracket 57 secured to the side wall of the metal casing 11 by means of threaded bushing 58 extending through a central aperture in the base of the cup 56 and a corresponding aperture in the bracket 57, the bushing being clamped into position by means of a lock nut 59. A hollow cylindrical cap 60 is provided having an internally threaded portion 61, adapted to engage the threads of the bushing 58, extending a short distance inward from the mouth of the cap and terminating in an inwardly extending annular shoulder 62 for engaging the end of the said bushing.

Inwardly of the said shoulder, the cap 60 is hollow to provide a chamber 63 housing a filter screen 64 in the shape of a cylindrical cup. The filter screen is provided with an annular flange 64a adapted to engage the annular shoulder 62. In assembling the cap 60 with the bushing 58, the screen 64 is inserted into the chamber 63 with the flange 64a resting on the shoulder 62 and threaded portion of the cap is screwed on to the end of the bushing 58 protruding from the base of the lock nut 59 until the end of the bushing clamps the flange 64a against the shoulder 62. At the lower end of the cap 60, a protruding nozzle 65 is provided having an annular flange 65a at its outer end.

The said reservoir is adapted to supply a treatment liquid by gravity feed to the cylinders of an automobile motor by way of the Venturi intake of the carbureter. It is necessary that the rate of feed be regulated to avoid unequal distribution of the liquid in the cylinders supplied by the venturi. According to the present invention, in order to supply the fluid at a uniform rate, an outlet comprising the nozzle at the lower end of the reservoir is provided with a constriction of such size as to regulate the flow of the liquid to a suitable rate. By this means, no adjustment is necessary to obtain the desired rate of the flow.

In the accompanying drawings, the said means which automatically regulates the flow of the liquid consists of a constricted passage 66 formed at the lower end of the chamber 63 of the cap 60, and providing a communicating passage between said chamber and the bore of the nozzle 65.

A length of flexible tubing 67 of oil-resistant material, such as neoprene, is slipped over the nozzle member 65 and clamped thereto by means of a split annular clamp 67a, retention of the tubing being aided by the flange 65a on the end of the nozzle. At the opposite end of the tube 67, a short length of metal tubing 68 is preferably inserted therein and clamped thereto by means of a split annular clamp 67b. The protruding end of the metal tubing 68 constitutes a substantially rigid outlet for the flexible tube 67.

In order to facilitate introduction of a treatment liquid into the cylinders of an automobile engine by way of the Venturi tubes of the carbureter, means for supporting the outlet tube in the venturi of the carbureter is provided, comprising a spring clip 70 as shown in Fig. 6 having a hook 71 at one end for engaging the edge of the carbureter intake, an outwardly bent elbow 72 intermediate its ends, and an outwardly bent ear 73 at the opposite end thereof, said ear and elbow being apertured to engage and frictionally retain the outlet tube 68 when the latter is inserted therethrough. The location of the apertures in the elbow and the ear is constructed so that the outlet tube 68 is supported in a position extending into a venturi of the carbureter when the hooked end 71 of the said clip is supported in engagement with the edge of the carbureter air intake.

According to the present invention, the testing device, including the reservoir, is mounted on a support in such a manner that it may be conveniently adjusted in such a position above the motor as to permit easy manipulation and observation of the device. This means for supporting the testing device comprises a rigid support rod having a ball mounting on the end thereof, cooperating with a socket formed in the casing 11 of the testing device, and a clamp for securing the ball mounting in the said socket. By this means, the testing device may be universally adjusted in any desired position above the motor of an automobile engine to be tested.

Means for supporting the testing device of the present invention is shown in Fig. 3, and preferably compirses a spherical ball mounting 75 carried on the end of a rigid supporting rod 76, said ball mounting engaging the aperture in the rear wall of the casing 11. Preferably, a thickened reenforcing plate 77, having a depression 78 forming a socket for the ball mounting, is positioned against the inner surface of the casing 11 in such a manner that the socket 78 is aligned with the aperture in the said wall.

An L-shaped clamp member 79 having a forked end 80 for engaging the opposite side of the ball mounting 75 is provided, the other end of the said clamp being supported against the outer surface of the casing 11 opposite a portion of the reenforcing plate 77. A bolt 81 passing through an aperture intermediate the ends of the clamping member and through an aligned aperture in the wall of the casing 11 is threaded into the reenforcing plate 77. By assembling the parts of the clamp and tightening the bolt 81, the plate 77 and clamp 79 are drawn together clamping the ball mounting between the socket 78 and the forked end 80 of the clamping member, while the wall of the casing 11 is clamped between the plate 77 and the supported end of the clamping member. Upon loosening the bolts 81 slightly, the device may be adjusted in any desired position with reference to the support arm 76, and retained in the adjusted position by tightening the bolt. If desired, plate 77 may be spot welded to the wall of the casing 11 or otherwise secured thereto. The clamping member 79 is preferably provided with webs 82 at its sides to reenforce the elbow formed by the two ends thereof.

The device is used according to the present invention in the following manner. The arm 76 is adjusted so that it supports the device above the automobile motor to be tested. The ball and socket mounting is adjusted so that the panel of the device is conveniently accessible for manipulation and observation. The clips 26 are attached to the spark plug terminals as shown in Fig. 5 and the knobs 55 are turned all the way to the right so that the spark gaps controlled thereby will be ineffective to shunt out the corresponding spark plugs. The motor is started and adjusted to run at a medium speed corresponding, for instance, to about twenty-five miles per hour in high gear.

The contactor 33 is then moved successively to each of the positions for connecting the discharge tube 17 successively to each of the spark plug terminals by rotating the knob 36. If the illumination of the tube for each plug is regular, uniform, and bright, it indicates that the ignition is satsfactory. Relatively dim or irregular illumination, or absence of illumination, indicates that the ignition is faulty. The trouble may then be sought in the spark plug itself, or in the wiring and the distributor circuits associated therewith.

By virtue of the disposition of the discharge tube behind a window in the panel of the closed casing, observation and comparison of the intensity of the illumination is facilitated, the tube being seen against the dark background and the angle of observation remaining substantially constant. Furthermore, by using a single tube, the various spark plugs may be compared with each other, whereas the use of a separate tube for each spark plug would introduce as a variable the differences in the characteristics of the tubes themselves, which would interfere with such a comparison.

An indication of the source of the trouble is provided by manipulation of the spark gap between the movable contact strips 46 and the fixed strip 30 connected to the spark plug being tested. This is accomplished by moving the knob 55 slowly from right to left, thereby decreasing the gap between the movable part 49 and the strip 30 until an intermittent spark appears in the circular window 21. When this effect is first observed, the approximate resistance of the spark plug points may be read from the position of the pointer 55a on the millimeter scale on the panel facing. If it exceeds approximately one millimeter, the spacing of the point is too wide or the resistance of the plug is too high due to corrosion, and the faulty operation may generally be corrected by cleaning and resetting the spark plug points.

If the indicated spark gap is within the correct range, that is from about 0.5 to 1 millimeter, the trouble may be sought in the wiring or distributor circuit associated with the said spark plug. To test this, the lead from the spark plug terminal to the distributor is disconnected and the clip 26 attached to the said lead. While the engine is running, the knob 55 is again turned from right to left until a spark appears behind the aperture 21. The condition of the ignition wiring and distributor circuit is indicated by the position of the pointer 55a on the upper scale on the panel facing 14, which indicates whether the operation of the spark is normal, fair or weak. If the latter ranges are indicated, faulty insulation of the wiring or a fault in the distributor is probably the cause of the trouble, and the necessary repairs may then be undertaken.

As hereinbefore set forth, the disposition of the adjustable spark gaps behind the windows in the panel facilitates observation of the spark, since it is seen against a dark background. Furthermore, by providing lens-shaped sight windows, the effect is magnified and also aids in such observation. Moreover, by enclosing the spark gap in a closed casing, the spark is protected from access of explosive gases and fumes which are often present in garages and which may arise from the carbureter or the gas pump of the motor being tested. Thus, the danger of explosion or fire is substantially eliminated by the aforesaid arrangement.

A further advantage of the device is the fact that all of the high tension contacts are on the inside of the casing and the operator is protected from shock thereby.

Since spark plugs which operate normally under no load conditions sometimes break down when subjected to increased compression resulting under full load conditions, it is advantageous in testing the spark plugs according to the present invention to carry out the test under load. For this purpose, all of the cylinders except one or two to be tested are rendered inoperative by short circuiting their spark plug terminals, or by disconnecting the leads from the distributor to their spark plugs. The cylinders under test then operate against the compression of the other cylinders, which is equivalent to operation under full load conditions.

If the number of cylinders is the same as or less than that of the number of leads 24 of the testing device, the adjustable spark gaps associated therewith may be used to cut out the cylinders which are not being tested, merely by turning each of the knobs 55 corresponding to said cylinders all of the way to the left, thus bringing the movable strips 46 into contact with the fixed strips 30, and short circuiting the spark plugs connected thereto. The device has been shown as having four high tension leads and adjustable spark gaps, but obviously any number may be provided, or if desired, more than one of the testing devices as shown may be simultaneously used for this purpose.

The cylinders operating under load are then tested in the manner hereinbefore described by means of the luminous discharge tube and if the operation is found to be faulty, the spark plug may be replaced or cleaned as the case may require.

The reservoir 56 is provided for introducing a treatment liquid into the cylinders, the liquid acting as a penetrating solvent for gum deposited in the cylinders, and around the valves. The solvents generally used are in general petroleum products which are combustible. Accordingly, it is necessary to introduce the liquid into the cylinders while the latter are not firing so that it may exert its solvent action without combustion. Otherwise, it would be almost immediately burned and its beneficial effect lost.

The liquid is introduced into the motor from the reservoir 56 through a venturi of the carbureter, by inserting the outlet tube 62 therein as indicated in Fig. 6. In the case of a dual carbureter having two venturis, each supplying half of the cylinders, the leads 24 of the testing device are connected to the spark plug of the cylinders to be treated. By moving all of the knobs 55 to the left, the spark plugs of the said cylinders are short-circuited while the motor runs on the cylinders supplied by the other venturi of the carbureter.

A suitable amount of treating liquid is then placed in the reservoir, and according to the present invention it runs into the venturi at a rate determined by the size of the constriction 58, no adjustment being necessary to regulate the flow. The amount of liquid which is used is determined by the number of cylinders to be treated, for instance, two ounces of liquid are in general sufficient for each cylinder.

If there is only one venturi in the carbureter, one half of the cylinders are treated at a time by short-circuiting half of the spark plugs in the above described manner, the liquid entering the other cylinders being allowed to be burned up. Obviously, this requires twice the amount of treatment liquid for degumming the entire engine.

Preferably, the testing of the spark plugs is repeated after the treatment with fluid, since particles of carbon loosened by the treatment may become lodged between the spark plug pointer and interfere with proper ignition.

Variations and modifications may be made within the scope of this invention and portions of the improvements may be used without others.

I claim:

1. In an ignition testing device for internal combustion engines, a closed housing having a sight opening therein; a single luminous electric discharge tube mounted behind said sight opening; means for connecting one terminal of the said discharge tube directly to a ground; a plurality of contacts insulatedly carried within the housing; insulated means for connecting said contacts to the high tension terminals of the spark plugs in an internal combustion engine; means within the casing for selectively connecting said contacts to the other terminal of said discharge tube; insulated means on the exterior of the casing for manually adjusting the position of said connecting means; a plurality of switches within the casing for connecting one or more of the contacts to the ground; and manual control means on the exterior of the casing for adjusting said switches individually in contact-grounding position.

2. In an ignition testing device for internal combustion engines, a closed casing having a plurality of sight openings therein; translucent means for covering said sight openings; a pair of terminals within the casing disposed respectively at opposite sides of each of said openings, constituting a spark gap; means for connecting one terminal of each pair to a ground; insulated means for connecting each opposite terminal respectively to a portion of the high tension ignition circuit of an internal combustion engine; manually operable means having an insulated portion carried on the exterior of the casing for manual adjustment thereof, said manual means moving the contacts behind the said sight openings toward or away from each other, the range of movement of each of said pairs of terminals including at least one position in which they are mutually engaged; and means for retaining said contacts against casual movement in any adjusted position.

3. In an ignition testing device for internal combustion engines, a closed casing having a plurality of sight openings therein; translucent means for covering said sight openings; a pair of terminals within the casing disposed respectively at opposite sides of each of said openings, constituting a spark gap; means for connecting one terminal of each pair to a ground; insulated means for connecting each opposite terminal respectively to a portion of the high tension ignition circuit of an internal combustion engine; manually operable means having an insulated portion carried on the exterior of the casing for manual adjustment thereof, said manual means moving the contacts behind the said sight openings toward or away from each other, the range of movement of each pair of terminals including at least one position in which they are mutually engaged; means for retaining said contacts against casual movement in any adjusted position; and means on the exterior of the casing for indicating the distance between the terminals of each spark gap.

4. In an ignition testing device for internal combustion engines, a closed casing having a plurality of sight openings therein; translucent windows covering each of said sight openings; a single luminous electric discharge tube behind one of said sight openings; a ground connection for one of the terminals of said discharge tube; a plurality of contacts insulatedly carried within the casing; insulated means for connecting said contacts respectively to the high tension terminals of the spark plugs of an internal combustion engine; adjustable means within the casing for selectively connecting said contacts to the opposite terminal of said discharge tube; a plurality of fixed spark gap terminals, each insulatedly mounted within the casing at one side of each of the remaining sight openings, said terminals being connected respectively to said contacts; a movable spark gap terminal extending to the opposite side of each of the latter sight openings; means connecting the latter terminals to the ground; means for independently moving each of the movable spark gap terminals across the sight openings toward or away from the fixed terminals at the opposite sides of said openings, said movable terminals contacting the fixed terminals at the limit of their movement toward the latter; and manual control means on the outside of the casing for adjusting the position of said movable spark gap terminals individually, and of said discharge tube connecting means.

5. In an ignition testing device having a casing, a plurality of leads for connecting portions of said device with portions of the ignition system of an automobile engine, and control and indicating means on the exterior of said casing, means for supporting said casing above said engine, comprising a rigid support rod adapted to extend over said engine, the end of said rod engaging said casing by means of a universally adjustable ball and socket joint; and means for clamping said joint in any desired position of adjustment.

6. In an ignition testing device having a casing, a plurality of leads for connecting portions of said device to portions of the ignition system of an automobile engine, and control and indicating means on the exterior of said casing, means for supporting said casing above said engine, comprising a rigid support member adapted to extend over the engine; a ball mounting carried at an extremity of said member, said ball mounting engaging a socket formed in the casing of said testing device; an L-shaped clamp member having a forked end engaging said ball mounting on the side opposite that engaged by said socket, and the other end supported against the wall of the casing at a point spaced apart from said socket; and draft means extending through the clamp member intermediate the ends thereof and engaging the wall of the casing, intermediate said socket and the end of the clamp supported against the said wall, for drawing the clamp and casing together, and thereby clamping the ball mounting between the forked end of the clamp and the socket in the wall of the casing.

7. In an ignition testing device, an adjustable spark gap comprising a support, a spark gap terminal secured in fixed position to said support; a movable spark gap terminal mounted for linear sliding movement on said supporting means toward or away from said fixed terminal; means for retaining said slidable terminal in any desired position of adjustment; and means for connecting said terminals respectively to a ground and to a portion of the high tension circuit of the ignition system of an automobile engine.

8. In an ignition testing device, an adjustable spark gap comprising a support; a spark gap terminal secured in fixed position to said support; a movable spark gap terminal mounted for linear sliding movement on said support; a rotatable member carried by the support having an eccentric portion engaging said slidable terminal so as to provide a two-way driving connection therewith for moving it positively toward or away from said fixed terminal; means for retaining said slidable terminal in any desired position of adjustment; and means for connecting said terminals respectively to a ground and to a portion of the high tension circuits of the ignition system of an automobile.

9. In an ignition testing device, an adjustable spark gap comprising a support, a spark gap terminal secured in fixed position to said support; a movable spark gap terminal mounted for linear sliding movement on said supporting means toward or away from said fixed terminal; resilient frictional means carried by said support and engaging said slidable terminal for retaining said slidable terminal in any desired position of adjustment; and means for connecting said terminals respectively to a ground and to a portion of a high tension circuit of the ignition system of an automobile engine.

10. In an ignition testing device, an adjustable spark gap comprising a support; a spark gap terminal secured in fixed position to said support; a movable spark gap terminal mounted for linear sliding movement on said support; a rotatable member carried by the support having an eccentric portion engaging said slidable terminal so as to provide a two-way driving connection therewith for moving it positively toward or away from said fixed terminal, said movable terminal forming a contact with said fixed terminal at one limit of its motion; means for retaining said slidable terminal in any desired position of adjustment; and means for connecting said terminals respectively to a ground and to a portion of the high tension circuits of the ignition system of an automobile.

11. In an ignition testing device, an adjustable spark gap comprising a support; a spark gap terminal secured in fixed position to said support; a movable spark gap terminal mounted for linear sliding movement on said support; a rotatable member carried by the support having an eccentric portion engaging said slidable terminal so as to provide a two-way driving connection therewith, for moving it positively toward or away from said fixed terminal; an indicator carried by said rotary member and cooperating with suitable indicia on the support for indicating the spacing between said spark gap terminals; resilient friction means for retaining said slidable terminal in any desired position of adjustment; and means for connecting said terminals respectively to a ground and to a portion of the high tension circuits of the ignition system of an automobile.

12. In an ignition testing device for automobile engines, a panel; a sight opening in said panel; a spark gap terminal secured in fixed position to said panel and extending to one side of said sight opening; a movable spark gap terminal mounted for linear sliding movement on said panel; a rotatable member extending through said panel and journaled therein, having an eccentric portion engaging said slidable terminal so as to provide a two-way driving connection therewith for moving it positively toward or away from said fixed terminal across the sight opening in the panel; insulated means carried by said rotatable member on the side of the panel opposite said terminals for manually adjusting said member; resilient frictional means for retaining said slidable terminal in any desired position of adjustment; and means for connecting said terminals respectively to a ground and to a portion of the high tension circuits of the ignition system of an automobile.

13. In an ignition testing device for automobile engines, a panel of insulating material; a plurality of sight openings in said panel; a plurality of fixed spark gap terminals secured to said panel to extend respectively to the sides of said sight openings; insulated means for connecting said terminals respectively to portions of a high tension circuit of the ignition system of an automobile; a metal carrier strip secured to said panel; means for connecting said carrier strip to a ground; a plurality of movable spark gap terminals mounted for linear sliding movement upon and engaging said carrier strip; a plurality of rotatable members extending through said panel and journaled therein, having eccentric portions respectively engaging portions of said slidable spark gap terminals so as to provide a two-way driving connection therewith for moving the same toward or away from the corresponding fixed terminals across the sight openings in the panel; means carried by each of said rotary members on the side of the panel opposite said spark gap terminals for manually adjusting said slidable terminals; and resilient frictional means for retaining the slidable terminals in any desired position of adjustment.

14. An ignition testing device as defined in claim 1, wherein each of said plurality of switches comprises a pair of relatively movable terminals, one connected to one of said high tension contacts, and the other having a ground connection, the terminals of each switch being movable by said manual control means to engage each other for grounding the corresponding high tension contact and being adjustably separable thereby to increase the spacing thereof progressively so as to constitute a variable spark gap, said housing having a sight window therein adjacent the switch terminals for observing the operation of said spark gap.

15. In an ignition testing device for internal combustion engines, a closed housing having a sight opening therein; a single luminous electric discharge tube mounted behind said sight opening; a plurality of contacts insulatedly carried within the housing; insulated means for connecting said contacts to the high tension terminals of the spark plugs in an internal combustion engine; means within the casing for selectively connecting said contacts to a terminal of said discharge tube; insulated means on the exterior of the casing for manually adjusting the position of said connecting means; a plurality of switches within the casing for connecting one or more of the contacts to the ground; and manual control means on the exterior of the casing for adjusting the said switches individually in contact grounding position.

16. In an ignition testing device for internal combustion engines, a closed casing having a plurality of sight openings therein; translucent windows covering each of said sight openings; a single luminous electric discharge tube behind one of said sight openings; a plurality of contacts insulatedly carried within the casing; insulated means for connecting said contacts respectively to the high tension terminals of the spark plugs in an internal combustion engine; adjustable means within the casing for selectively connecting said contacts to a terminal of said luminous discharge tube; a plurality of independently adjustable spark gaps, each comprising a pair of relatively movable terminals within the casing behind the remaining sight openings, said pairs of terminals being adjustable to contact each other in one adjusted position; means for connecting one terminal of each spark gap to a ground; means connecting the opposite terminals of said spark gaps respectively to said high tension contacts; and manual control means on the outside of the casing for adjusting said spark gaps individually, and for adjusting said discharge tube connecting means.

HERBERT G. LEHMANN.